UNITED STATES PATENT OFFICE 2,122,127

ORTHO-HYDROXYAZO DYES AND PROCESS FOR MANUFACTURING THE SAME

Walther Benade, Dessau in Anhalt, Germany, assignor to General Aniline Works, Inc., New York, N. Y., a corporation of Delaware No Drawing. Application December 31, 1936, Serial No. 118,572. In Germany January 17, 1936

6 Claims. (Cl. 260—94)

My present invention relates to new ortho-hydroxyazo dyes and to a process for manufacturing the same.

More particularly it relates to dyes which are suitable for dyeing wool, the dyeing being chromated either by the application of the single bath-chrome process or by a subsequent treatment with compounds forming the chromium complex compound.

It is based on the observation that valuable azo dyes are obtained by coupling the diazo compound of an amine corresponding to the general formula

wherein X is a radicle of the group consisting of —OH and —COOH, X being in ortho-position to the —NH₂-group and R is a radicle of the group consisting of a benzene-, chlorobenzene-, nitrobenzene-, alkylbenzene-, chloronitrobenzene-radicle and the alkyl derivatives thereof, with a hydroxynaphthalene sulfonic acid anilide which contains a carboxyl group as a substituent in the anilide radicle and corresponds to the general formula

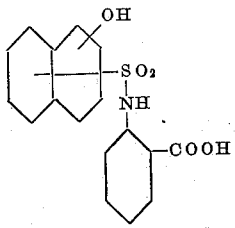

The dyes are characterized by a good dyeing capacity by the single bath-chrome process and yield on wool dyeings which have good fastness to washing and fulling as well as good fastness to light.

The following examples illustrate the invention, the parts being by weight:—

*Example 1.*—18.9 parts of 4-nitro-6-chloro-2-amino-1-hydroxybenzene are suspended in 200 parts of water and after addition of 25 parts of hydrochloric acid of 12° Bé. are diazotized by means of 6.9 parts of sodium nitrite. The diazo mixture is run into a solution mixed with ice of 35 parts of 2-hydroxynaphthalene-6-sulfonic acid anilide-2'-carboxylic acid and 25 parts of calcined sodium carbonate in about 1000 parts of water. When combination is complete the dye is worked up in the usual manner. On drying it forms a dark powder of good solubility which dyes wool by the single bath-chrome process violet-brown tints of good fastness to washing and fulling and very good fastness to light.

The 2-hydroxynaphthalene-6-sulfonic acid anilide-2'-carboxylic acid is obtainable by esterifying 2-hydroxynaphthalene-6-sulfonic acid with benzene sulfochloride, treating the product obtained with a phosphorous chloride to form the corresponding sulfochloride, condensing the latter with anthranilic acid and splitting off the benzene sulfonic acid by heating with an alkali lye.

The same dye is obtainable when using as azo component the condensation product made from anthranilic acid and 2-hydroxynaphthalene-1-carboxylic acid 6-sulfochloride. In this case the COOH-group in 1-position is split off when coupling with the diazo compound.

*Example 2.*—Into a solution of 35 parts of 1-hydroxynaphthalene-5-sulfonic acid anilide-2'-carboxylic acid and 25 parts of calcined sodium carbonate in about 1000 parts of water there is run the diazo-mixture obtained from 19.9 parts of 4,6-dinitro-2-amino-1-hydroxybenzene, 6.9 parts of sodium nitrite and 25 parts of hydrochloric acid of 12° Bé. in about 500 parts of water. The dye which is worked up in the usual manner is, when dry, a dark powder soluble in water to a red-violet solution and dyeing wool by the single bath-chrome process a greenish black of good properties of fastness.

The preparation of the 1-hydroxynaphthalene-5-sulfonic acid anilide-2'-carboxylic acid is carried out in an analogous manner as pointed out in Example 1 when starting from the benzene sulfonic acid ester of 1-hydroxynaphthalene-5-sulfonic acid.

*Example 3.*—17.8 parts of 4,6-dichloro-2-amino-1-hydroxybenzene are diazotized in 400 parts of water by addition of 25 parts of hydrochloric acid of 12° Bé. and 6.9 parts of sodium nitrite. The diazo compound is allowed to run into a solution of 35 parts of 1-hydroxynaphthalene-4-sulfonic acid anilide-2'-carboxylic acid. When coupling is complete the dye is separated and dried. It dyes wool by the single bath-chrome process violet tints of good fastness.

The 1-hydroxynaphthalene-4-sulfonic acid anilide-2'-carboxylic acid is prepared by the sequence of reactions indicated in Example 1 when starting from 1-hydroxynaphthalene-4-sulfonic acid.

*Example 4.*—A solution of 35 parts of 2-hydroxynaphthalene-4-sulfonic acid anilide-2'-carboxylic acid and 25 parts of sodium carbonate in about 800 parts of water is united with the diazo compound prepared from 15.4 parts of 4- nitro-2-amino-1-hydroxybenzene, 6.9 parts of sodium nitrite and 25 parts of hydrochloric acid of 12° Bé. in about 400 parts of water. The dye formed is separated by addition of common salt and dried. It dyes wool in the presence of a chromium mordant black tints.

Dyes of similar properties are obtainable when using instead of 4-nitro-2-amino-1-hydroxybenzene the substitution products thereof as, for instance, 6-chloro-4-nitro-2-amino-1-hydroxybenzene or 6-methyl-4-nitro-2-amino-1-hydroxybenzene.

In the foregoing examples 2-amino-1-hydroxybenzenes are used as diazo components. However, in an analogous manner 2-aminobenzene-1-carboxylic acid and its nitro-, halogeno- or alkyl-substitution products may be diazotized and coupled with the hydroxynaphthalene sulfonic acid anilides bearing a —COOH-group in the anilide radicle. This modification is illustrated by the following example without being limited to the specific details given therein.

*Example 5.*—13.7 parts of 2-aminobenzene-1-carboxylic acid are diazotized in the usual manner. The diazo compound is allowed to run into an iced solution of 25 parts of 2-hydroxynaphthalene-6-sulfonic acid anilide-2'-carboxylic acid in 100 parts of water containing 30 parts of calcined sodium carbonate. The dye formed is worked up in the usual manner. After drying, it forms a red powder of good solubility. The chromated dyeings on wool are red of good fastness to washing, fulling and light.

What I claim is:—

1. The process which comprises diazotizing an amine of the general formula

wherein X is a member of the group consisting of —OH and —COOH, X being in ortho-position to the NH₂-group and R is a member of the group consisting of the benzene-, chlorobenzene-, nitrobenzene-, alkylbenzene-, chloronitrobenzene-radicles, and coupling the diazo compound with a hydroxynaphthalene sulfonic acid anilide of the general formula

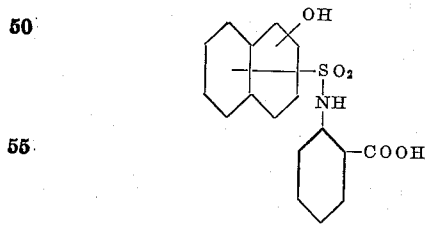

2. The process which comprises diazotizing an amine of the general formula

wherein X is a member of the group consisting of —OH and —COOH, X being in ortho-position to the NH₂-group and R is a member of the group consisting of the benzene-, chlorobenzene-, nitrobenzene-, alkylbenzene-, chloronitrobenzene-radicles, and coupling the diazo compound with 2-hydroxynaphthalene-6-sulfonic acid anilide-2'-carboxylic acid of the formula

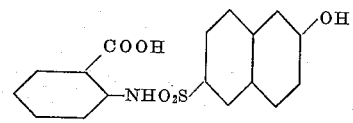

3. The process which comprises diazotizing anthranilic acid and coupling the diazo compound with 2-hydroxynaphthalene-6-sulfonic acid anilide-2'-carboxylic acid of the formula

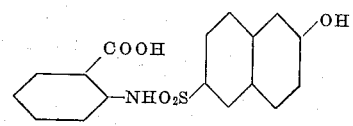

4. The ortho-hydroxyazo dyes which yield on wool with a chromium mordant tints of good fastness to light, to washing, and to fulling and which correspond to the general formula

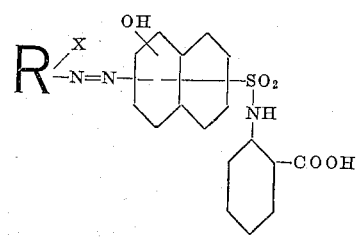

in which X is a member of the group consisting of —OH and —COOH, X being in ortho-position to the azo-bridge and R is a member of the group consisting of the benzene-, chlorobenzene-, nitrobenzene-, alkylbenzene-, chloronitrobenzene-radicles.

5. The ortho-hydroxyazo dyes which yield on wool with a chromium mordant tints of good fastness to light, to washing, and to fulling and which correspond to the general formula

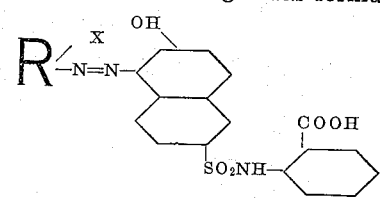

in which X is a member of the group consisting of —OH and —COOH, X being in ortho-position to the azo-bridge and R is a member of the group consisting of the benzene-, chlorobenzene-, nitrobenzene-, alkylbenzene-, chloronitrobenzene-radicles.

6. The ortho-hydroxyazo dye which dyes wool with a chromium mordant red tints of good fastness to washing, fulling and light, which corresponds to the formula

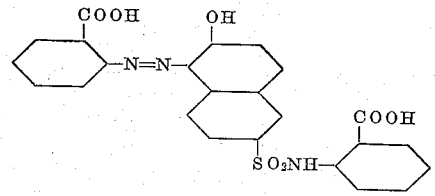

WALTHER BENADE.